US011426898B2

(12) United States Patent
Bruening (10) Patent No.: US 11,426,898 B2
(45) Date of Patent: Aug. 30, 2022

(54) PROCESS FOR FABRICATION OF FIBER COMPOSITES USING DUAL-CURE FREE-FORM 3D-PRINTED TAILORED FIBER PLACEMENT PREFORM

(71) Applicant: Konica Minolta Business Solutions U.S.A., Inc., San Mateo, CA (US)

(72) Inventor: Karsten Bruening, Portola Valley, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 915 days.

(21) Appl. No.: 16/235,252

(22) Filed: Dec. 28, 2018

(65) Prior Publication Data

US 2020/0206977 A1    Jul. 2, 2020

(51) Int. Cl.
*B29B 11/16*      (2006.01)
*B33Y 10/00*      (2015.01)
(Continued)

(52) U.S. Cl.
CPC .............. *B29B 11/16* (2013.01); *B29B 13/08* (2013.01); *B29C 70/48* (2013.01); *B33Y 10/00* (2014.12);
(Continued)

(58) Field of Classification Search
CPC ......... B29B 11/16; B29B 13/08; B29C 70/48; B29C 64/118; B29C 64/321; B29C 70/00;
(Continued)

(56) References Cited

U.S. PATENT DOCUMENTS 4,707,212 A    11/1987  Hailey et al.
5,276,068 A    1/1994   Waknine
(Continued)

FOREIGN PATENT DOCUMENTS

EP    0567845 A1    11/1993
EP    0818289 A3    1/2000
(Continued)

OTHER PUBLICATIONS

International Search Report issued in corresponding International Application No. PCT/US2019/053998 dated Dec. 5, 2019 (4 pages).
(Continued)

*Primary Examiner* — Thomas C Lee
*Assistant Examiner* — Charles Cai
(74) *Attorney, Agent, or Firm* — Osha Bergman Watanabe & Burton LLP (57) ABSTRACT

A method for generating a thermoset Fiber-Reinforced Polymer (FRP) composite preform includes: dispensing, from a print head of a 3D-printer, a dual-cure resin coated fiber including a dual-cure resin with a ultra-violet (UV)-curable component and a thermally-curable component; curing, during the dispensing of the dual-cure resin coated fiber, the UV-curable component with a UV light source such that the dual-cure resin coated fiber is partially cured and contacting lengths of the partially-cured dual-cure resin coated fiber bond together; and positioning the print head during the dispensing and curing of the dual-cure resin coated fiber to three-dimensionally print the thermoset FRP composite preform.

10 Claims, 7 Drawing Sheets

(51) Int. Cl.
  *B33Y 30/00* (2015.01)
  *B33Y 50/02* (2015.01)
  *B29B 13/08* (2006.01)
  *B29C 70/48* (2006.01)
  *B29K 101/10* (2006.01)

(52) U.S. Cl.
  CPC ............... *B33Y 30/00* (2014.12); *B33Y 50/02* (2014.12); *B29K 2101/10* (2013.01)

(58) Field of Classification Search
  CPC ....... B29C 70/382; B33Y 10/00; B33Y 30/00; B33Y 50/02; B33Y 40/20; B33Y 40/10; B33Y 70/10; B29K 2101/10
  See application file for complete search history.

(56) References Cited

U.S. PATENT DOCUMENTS

| | | | |
|---|---|---|---|
| 9,156,205 B2 | 10/2015 | Mark et al. | |
| 2002/0031918 A1* | 3/2002 | deRochemont | H01L 23/142 257/E23.105 |
| 2013/0075387 A1* | 3/2013 | Lee | C04B 41/87 427/379 |
| 2014/0291886 A1* | 10/2014 | Mark | B33Y 30/00 264/259 |
| 2017/0326761 A1* | 11/2017 | Springer | C09D 133/08 |
| 2018/0202080 A1* | 7/2018 | Kozar | B29C 64/141 |
| 2018/0326651 A1* | 11/2018 | Weisenberg | B29C 73/04 |

FOREIGN PATENT DOCUMENTS

| | | |
|---|---|---|
| WO | 2016/063282 A1 | 4/2016 |
| WO | 2017/044381 A1 | 3/2017 |
| WO | 2017/112653 A1 | 6/2017 |

OTHER PUBLICATIONS

Written Opinion of the International Searching Authority issued in corresponding International Application No. PCT/US2019/053998 dated Dec. 5, 2019 (4 pages).

* cited by examiner

PRIOR ART

PROCESS FOR FABRICATION OF FIBER COMPOSITES USING DUAL-CURE FREE-FORM 3D-PRINTED TAILORED FIBER PLACEMENT PREFORM

BACKGROUND

Fiber-reinforced polymer (FRP) composite objects have gained popularity in recent years, particularly in manufacturing large and small parts for aircraft (e.g., Boeing 747, Airbus A350, and Airbus A380) and electric automobiles (e.g., BMW i-Series). Conventional fabrication of FRP composite objects involves laying down fibers in the form of wovens, mats, tows, or rovings by hand or by machine to form a flat flexible preform. In order to produce a three-dimensional composite object, the flat flexible preform must be draped and manipulated into a three-dimensional mold, increasing production time and cost.

SUMMARY

In general, in one aspect, the invention relates to a method for generating a thermoset FRP composite preform. The method comprises: dispensing, from a print head of a 3D-printer, a dual-cure resin coated fiber comprising a dual-cure resin with an ultra-violet (UV)-curable component and a thermally-curable component; curing, during the dispensing of the dual-cure resin coated fiber, the UV-curable component with a UV light source such that the dual-cure resin coated fiber is partially cured and contacting lengths of the partially-cured dual-cure resin coated fiber bond together; and positioning the print head during the dispensing of the dual-cure resin coated fiber to three-dimensionally print the thermoset FRP composite preform.

In general, in another aspect, the invention relates to a system for generating a thermoset FRP composite preform. The system comprises: a 3D-printer that dispenses, from a print head, a dual-cure resin coated fiber comprising a dual-cure resin with a UV-curable component and a thermally-curable component; and a UV light source that cures, during the dispensing of the dual-cure resin coated fiber, the UV-curable component such that the dual-cure resin coated fiber is partially cured and contacting lengths of the partially-cured dual-cure resin coated fiber bond together, wherein the 3D-printer positions the print head during the dispensing of the dual-cure resin coated fiber to three-dimensionally print the thermoset FRP composite preform.

In general, in another aspect, the invention relates to a non-transitory computer readable medium (CRM) storing computer readable program code for generating a thermoset FRP composite preform. The computer readable program code causes a computer to control a 3D-printer to: dispense, from a print head of a 3D-printer, a dual-cure resin coated fiber comprising a dual-cure resin with a UV-curable component and a thermally-curable component; cure, during the dispensing of the dual-cure resin coated fiber, the UV-curable component with a UV light source such that the dual-cure resin coated fiber is partially cured and contacting lengths of the partially-cured dual-cure resin coated fiber bond together; and position the print head during the dispensing of the dual-cure resin coated fiber to three-dimensionally print the thermoset FRP composite preform.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect of the characteristic was intended to provide.

In general, embodiments of the invention provide a system, a method, and a non-transitory CRM for generating a thermoset FRP composite preform.

Figure 1:
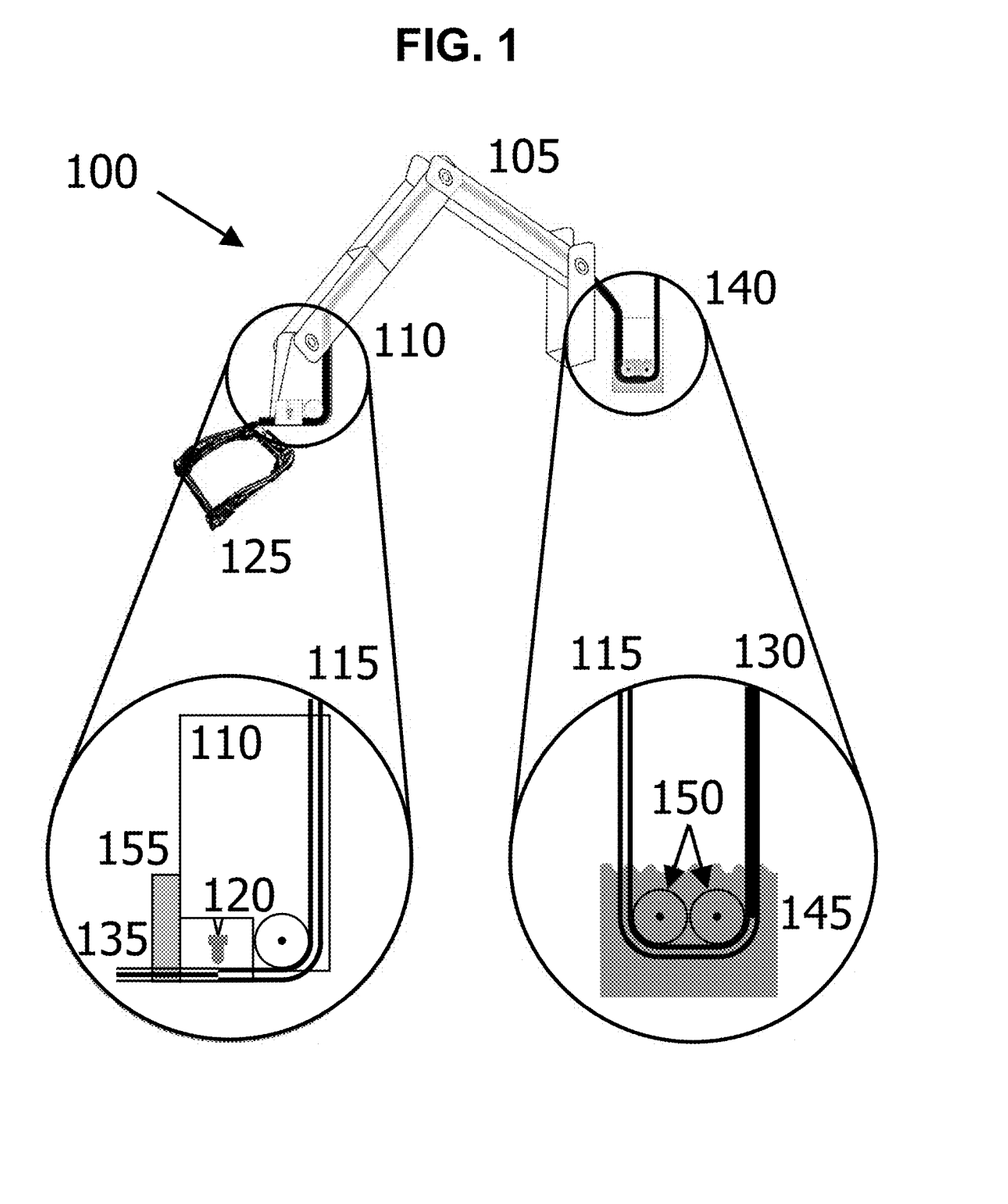
FIG. 1 shows a system in accordance with one or more embodiments of the invention.

FIG. 1 shows a system (100) in accordance with one or more embodiments of the invention. The system (100) has multiple components, including, for example, a 3D-printer (105), a print head (110), a dual-cure resin coated fiber (115), and a UV light source (120). Each of these components is discussed in detail below.

In general, the 3D-printer (105) dispenses the dual-cure resin coated fiber (115) from the print head (110). The dual-cure resin coated fiber (115) comprises a dual-cure resin with a UV-curable component and a thermally-curable component. During the dispensing process, the UV light source (120) cures the UV-curable component and the 3D-printer (105) positions (i.e., moves and orients) the print head (110) to three-dimensionally print a thermoset FRP composite preform (125).

In one or more embodiments, free-form placement of the dual-cure resin coated fiber (115) by the 3D-printer (105) can create thermoset FRP composite preforms (125) with high strength and low mass, while reducing cycle time and overall cost. Complex and arbitrary free-form shapes can be printed in space to optimize placement of the dual-cure resin coated fiber (115), to maximize desirable properties (e.g., increase strength, stiffness, flexibility, cosmetic appearance, resin permeability), and to reduce weight, production time, production cost.

Furthermore, the thermoset FRP composite preform (125) may closely resemble the final FRP composite object without relying on an interwoven or supplemental support structure to hold the shape of the thermoset FRP composite preform (125) during fabrication. Interwoven or supplemental materials of a supplemental support structure within a composite preform can introduce undesirable microdefects and nucleation sites for crack initiation or propagation.

Therefore, the system (100) may surpass the speed, efficiency, and quality of conventional FRP composite manufacturing techniques, such as Automated Tape Laying (ATL) or Tailored Fiber Placement (TFP).

In one or more embodiments of the invention, the 3D-printer (105) may comprise a multi-axis robot arm that positions the print head (110) during the three-dimensional printing process. The print head (110) may be rotatably mounted on the multi-axis robot to increase the degrees of freedom for positioning the print head (110). In one or more embodiments, the 3D-printer (105) positions the print head (110) in fewer than three dimensions.

In one or more embodiments, the 3D-printer (105) may comprise a gantry that positions the print head (110) during the three-dimensional printing process. Each axis of the gantry may provide linear or curved motion along a predetermined trajectory for each axis. The print head (110) may be rotatably mounted on the gantry to increase the degrees of freedom for positioning the print head (110).

In one or more embodiments, the 3D-printer (105) may comprise a fiber supply guide that guides or manipulates the dual-cure resin coated fiber (115) through the 3D-printer (105).

In one or more embodiments, the 3D-printer (105) may comprise a substrate (build plate or print bed, not shown) with a surface upon which the thermoset FRP composite preform (125) is three-dimensionally printed. The substrate may be fixed or moveable such that the location of the thermoset FRP composite preform (125) complements the range for positioning the print head (110). The 3D-printer (105) may control adhesion between the substrate and the thermoset FRP composite preform (125) by controlling the temperature of the surface of the substrate.

In one or more embodiments, the print head (110) dispenses at least a dual-cure resin coated fiber (115). The print head (110) may comprise a nozzle that dispenses the dual-cure resin coated fiber (115). The degrees of freedom for positioning and orienting the print head (110) by the 3D-printer (105) allow for optimized dispensing of the dual-cure resin coated fiber (115) and efficient cycle times. In a non-limiting example, the print head (110) may move at a speed of approximately 200 mm/s and may dispense the dual-cure resin coated fiber (115) at a speed of approximately 200 mm/s. The speed of the print head (110) and dispensing speed of the dual-cure resin coated fiber (115) do not necessarily need to match.

Furthermore, the movement and dispensing speeds of the print head (110) may exceed those used in conventional 3D-printing. In conventional printing of a "solid" object, both the internal framework and external surfaces require extremely high printing precision to produce a quality product. Because the shape of the final FRP object is determined by a molding step (e.g., high pressure resin transfer molding (HP-RTM)) after fabrication of the preform, precision required for positioning the print head (110) is greatly reduced compared to traditional 3D-printing. As a result, higher speeds may be used to lower cycle times and production cost.

In one or more embodiments, the dual-cure resin coated fiber (115) comprises a core fiber (130). In one or more embodiments, the core fiber (130) may be a bare high-strength and high-modulus carbon fiber, a carbon fiber yarn, a 3K tow, or a 50K tow, but is not particularly limited to these classes of fibers. In a non-limiting example, the core fiber (30) may be a Tenax® filament yarn, but is not particular limited to this product family. In one or more embodiments, the core fiber (130) may be an uncured pre-impregnated (prepreg) fiber. In a non-limiting example, the uncured pre-impregnated fiber may be a TORAYCA® carbon fiber, but is not particular limited to this product family.

In one or more embodiments, the core fiber (130) may be a glass fiber or an aramide fiber, but is not particularly limited to these materials. Furthermore, the core fiber (130) may be a hybrid or mixture of different fiber materials.

In one or more embodiments, the dual-cure resin coated fiber (115) comprises a dual-cure resin. The dual-cure resin may coat or impregnate the dual-cure resin coated fiber (115). The dual-cure resin may comprise bisphenol A diglycidyl ether, amine or anhydride hardeners, oligomeric acrylates, partially and/or fully acrylated epoxy oligomers (e.g., to provide bonding between photo-cured and heat-cured networks), photoinitiators (e.g., benzophenone derivatives), and other additives (e.g., accelerators, stabilizers, scavengers, initiators, etc.), but is not particularly limited to this list.

In one or more embodiments, the dual-cure resin includes a UV-curable component that is optically cured with UV light. In one or more embodiments, the wavelength of light required to cure the UV-curable component is not limited to a UV wavelength range. In one or more embodiments, the wavelength of light required to cure the UV-curable component may be greater than 100 nm and less than 400 nm, but is not particularly limited to this wavelength range as long as the desired effect can be achieved.

In general, the UV-curable component is cured by a wavelength of light that has sufficient energy to optically activate the UV-curable component. The UV-curable component may be substantially unaffected by exposure to temperatures during processing. The UV-curable component may be unaffected by the dispensing process.

In one or more embodiments, the dual-cure resin includes a thermally-curable component that is thermally cured by exposure to a predetermined temperature range for a predetermined time. The thermally-curable component may be substantially unaffected by exposure to the wavelength of light that cures the UV-curable component. In general, the thermally-curable component may be unaffected by the dispensing and three-dimensional printing process.

In one or more embodiments, the UV light source (120) exposes a surface of the dual-cure resin coated fiber (115) with light, cures the UV-curable component of the dual-cure resin coated fiber (115), and produces a partially-cured dual-cure resin coated fiber (135). The term "partially-cured" means that some or all of the UV-curable component of the dual-cure resin coated fiber (115) has been cured and the thermally-curable component is substantially uncured. The partially-cured dual-cure resin coated fiber (135) can support its own weight and shape during the three-dimensional printing process and subsequent handling by an operator or other equipment. In other words, the partially-cured dual-cure resin coated fiber (135) is strong enough and flexible enough such that the thermoset FRP composite preform (125) does not substantially deform, warp, or collapse in a permanent manner when handled or manipulated into a mold. In one or more embodiments, the partially-cured dual-cure resin coated fiber (135) may be tacky enough such that contacting length of the dispensed partially-cured dual-cure resin coated fiber (135) bond together.

In one or more embodiments, the UV light source (120) may be an incoherent light source such as an incandescent bulb, light emitting diode (LED), ensemble of UV LED lamps, arc lamp, or another suitable incoherent light source or optical system, but is not particularly limited to these sources. In one or more embodiments, the UV light source (120) may be a coherent light source such as a laser, dye-laser, gas laser, solid state laser, excimer laser, super-continuum laser, or another suitable coherent light source or optical system, but is not particularly limited to these sources.

In one or more embodiments, the UV light source (120) may be replaced by other light sources (i.e., the wavelength of light emitted by the light source is not limited to a UV wavelength range). In one or more embodiments, the wavelength of light may be greater than 100 nm and less than 400 nm, but is not particularly limited to this wavelength range. In one or more embodiments, the wavelength of light may be less than 100 nm or greater than 400 nm. In general, the wavelength of light has sufficient energy to optically cure the UV-curable component.

In a non-limiting example, the UV light source (120) may be replaced with an LED lamp with a power greater than or equal to 3 W and less than or equal to 30 W. The power of the light source may be fixed or adjustable during the three-dimensional printing process. The light source may illuminate the surface of the dual-cure resin coated fiber (115) with an intensity of 3 $J/mm^2$ or more, but is not particularly limited to this range. For example, the intensity may be less than 3 $J/mm^2$ if the lower intensity produces the partially-cured dual-cure resin coated fiber (135).

In one or more embodiments, the UV light source (120) may be integrated into the 3D-printer (105). In a non-limiting example shown in FIG. 1, the print head (110) may internally house the UV light source (120). Internally housing the UV light source (120) may allow for the reduction of stray light that may affect other parts of the thermoset FRP composite preform (125) or expose the operators to unwanted radiation. In a non-limiting example shown in FIG. 2, the print head (110) may externally house the UV light source (120). Externally housing the UV light source (120) may allow for segregation of physical components (e.g., dispensing components and light source components) and easier access for repair and replacement. In other words, the UV light source (120) may continuously cure the UV-curable component before, during, or after the dual-cure resin coated fiber (115) is dispensed from the print head (110).

In one or more embodiments, the UV light source (120) may be separate from the 3D-printer (105). In a non-limiting example, the UV light source (120) may be positioned and oriented by a second robot arm or second gantry system that is independent from the print head (110). A second positioning system may allow for more uniform or higher intensity light exposure on the surface of the dual-cure resin coated fiber (115).

In one or more embodiments, the system (100) dispenses and partially cures the dual-cure resin coated fiber (115) such that the partially-cured dual-cure resin coated fiber (135) forms a thermoset FRP composite preform (125) that is free-standing, arbitrary in shape, and that can support its own weight and shape during the three-dimensional printing process. While the 3D-printer (105) may comprise a substrate, the thermoset FRP composite preform (125) is not restricted to the geometry of the substrate. The thermoset FRP composite preform (125) may be manufactured in an arbitrary free-form three-dimensional shape above the substrate. In other words, the thermoset FRP composite preform (125) can be manufactured to closely resemble the shape of the final thermoset FRP composite object.

In a non-limiting example, the 3D-printer (105) may dispense the dual-cure resin coated fiber (115) in a plurality of flat horizontal layers. In this non-limiting example, the beneficial physical properties of the core fiber (130) (e.g., high-strength and high-modulus) may be limited to directions defined by the plane of the dispensed horizontal layers.

However, the 3D-printer (105) may produce a thermoset FRP composite preform (125) with more isotropic physical properties. Therefore, in another non-limiting example, the 3D-printer (105) may dispense the dual-cure resin coated fiber (115) in both horizontal and vertical directions while three-dimensionally printing the thermoset FRP composite preform (125). In other words, the beneficial physical properties of the core fiber (130) (e.g., high-strength and high-modulus) may be applied to any direction in space.

In one or more embodiments, the dispensing pattern may be specifically tailored to the shape or design of the thermoset FRP composite preform (125). In one or more embodiments, the dual-cure resin coated fiber (115) may be dispensed with varying density and three-dimensional orientation to optimize the strength or flexibility of a portion of the thermoset FRP composite preform (125) for a predetermined loading scenario. In one or more embodiments, the dual-cure resin coated fiber (115) may be dispensed with varying density and three-dimensional orientation to optimize the surface quality or decrease the weight of a portion of the thermoset FRP composite preform (125).

Because the partially-cured dual-cure resin coated fiber (135) is strong enough to support the weight and shape of the thermoset FRP composite preform (125) during the three-dimensionally printing process, the dispensing pattern may be arbitrary and free-form. Therefore, a supplemental support structure (e.g., supporting tape or stitching yarn) is not required to support the thermoset FRP composite preform (125) above the substrate during fabrication. Furthermore, the dispensing pattern is entirely independent of the shape of the substrate of the 3D-printer (105).

In one or more embodiments, the system (100) may further comprise a coating system (140) that, prior to the dispensing from the print head (110), forms the dual-cure resin coated fiber (115) by coating a core fiber (130) with a dual-cure resin. In one or more embodiments, the coating system (140) may impregnate the core fiber (130) with the dual-cure resin.

In one or more embodiments, the coating system (140) may comprise a bath of dual-cure resin (145). The core fiber (130) may be dip-coated in the bath of dual-cure resin (145) to form the dual-cure resin coated fiber (115). The core fiber (130) may be guided into the bath by one or more pulleys (150), by gravity alone, or by a mechanical passage, but is not necessarily limited to these guides. The core fiber (130) may be completely submerged in the bath of dual-cure resin (145) or drawn along the surface, but is not necessarily limited to these levels of dip-coating.

In one or more embodiments, the coating system (140) may comprise a sprayer. The sprayer may spray a dual-cure resin onto and coat a core fiber (130) to form the dual-cure resin coated fiber (115). The sprayer may emit an aerosol form or liquid form of the dual-cure resin, but is not necessarily limited to these consistencies.

In one or more embodiments, the coating system (140) may comprise a brush. The brush may brush a dual-cure resin onto and coat a core fiber (130) to form the dual-cure resin coated fiber (115). The brush may comprise a bristle applicator or a roller applicator, but is not necessarily limited to these applicators.

In one or more embodiments, the coating system (140) may be contained within the 3D-printer (105) such that: the core fiber (130) is fed into 3D-printer (105); the coating system (140) coats the core fiber (130) to form the dual-cure resin coated fiber (115); and the 3D-printer (105) dispenses and partially cures the dual-cure resin coated fiber (115).

In one or more embodiments, the coating system (140) may be separate from the 3D-printer (105) such that: the core fiber (130) is fed into the coating system (140); the coating system (140) coats the core fiber (130) to form the dual-cure resin coated fiber (115); the dual-cure resin coated fiber (115) is fed into the 3D-printer (105); and the 3D-printer (105) dispenses and partially cures the dual-cure resin coated fiber (115).

In one or more embodiments, the print head (110) comprises a chopper (155) that cuts the dual-cure resin coated fiber (115). In one or more embodiments, the chopper (155) is mechanical and may be a blade, a pair of scissors, a cutter, or the like, but is not particularly limited to these mechanical devices. In one or more embodiments, the chopper (155) may be an optical system comprising a laser that ablates or otherwise cuts the dual-cure resin coated fiber (115). In one or more embodiments, the chopper (155) may cut the dual-cure resin coated fiber (115) before the dual-cure resin coated fiber (115) is partially cured by the UV light source (120) (see FIG. 2). In one or more embodiments, the chopper (155) may cut the partially-cured dual-cure resin coated fiber (135) after the dual-cure resin coated fiber (115) is partially cured by the UV light source (120) (see FIG. 1).

Figure 2:
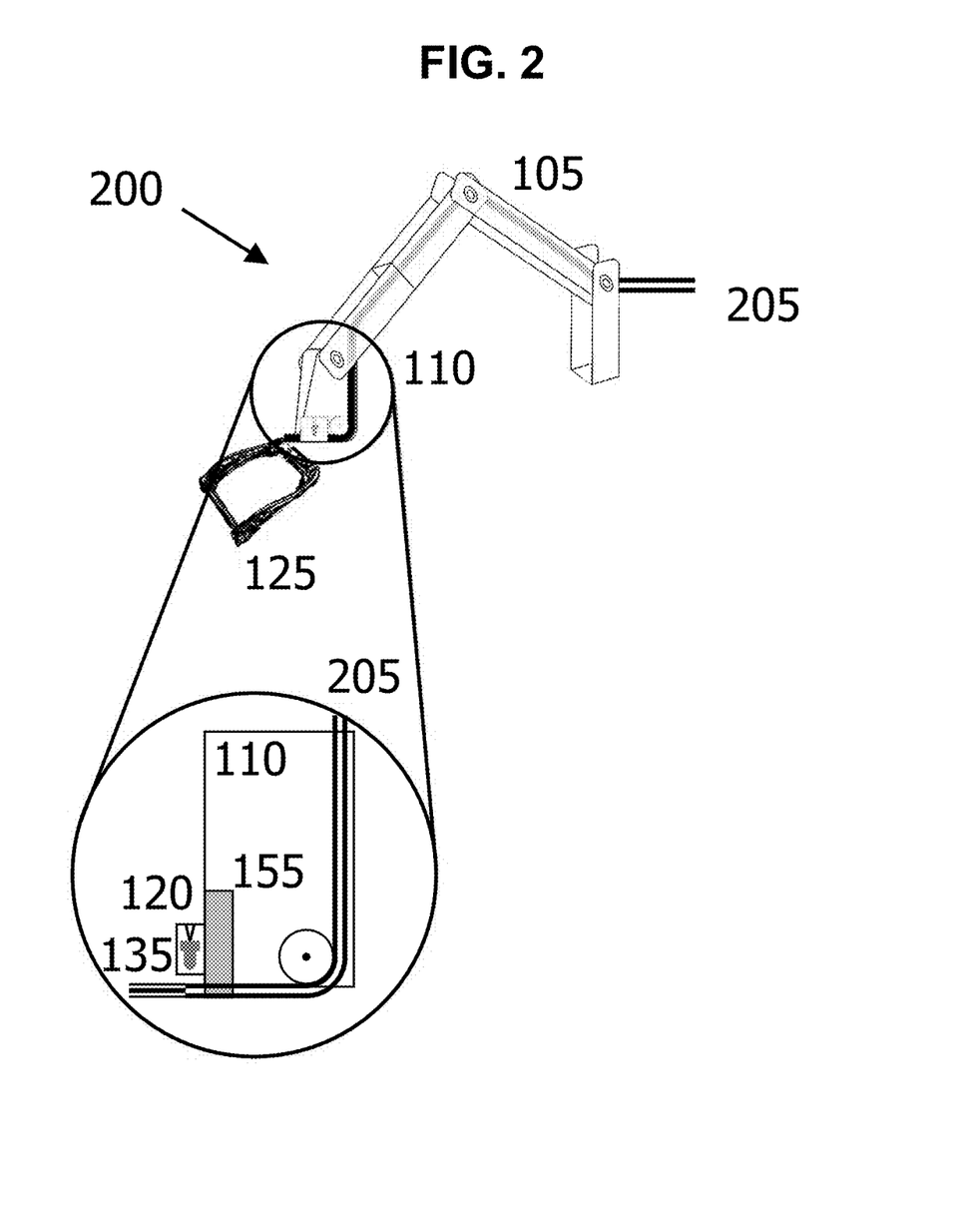
FIG. 2 shows another system in accordance with one or more embodiments of the invention.

FIG. 2 shows a system (200) in accordance with one or more embodiments of the invention. The 3D-printer (105) of the system (200) is directly fed an uncured pre-impregnated dual-cure fiber (205) comprising a dual-cure resin with a UV-curable component and a thermally-curable component. In one or more embodiments, the uncured pre-impregnated dual-cure fiber (205) is a core fiber (130) that has been preprocessed by a coating system (140) that is separate from the 3D-printer (105) and stored at a low temperature (i.e., in a temperature range that preserves the properties of the uncured pre-impregnated dual-cure fiber (205) and does not affect the thermally-curable component therein). The uncured pre-impregnated dual-cure fiber (205) may be continuously produced and fed in-line to the 3D-printer (105) or may be preprocessed and stored before being fed to the 3D-printer (105), but is not particularly limited to these configurations.

Figure 3:
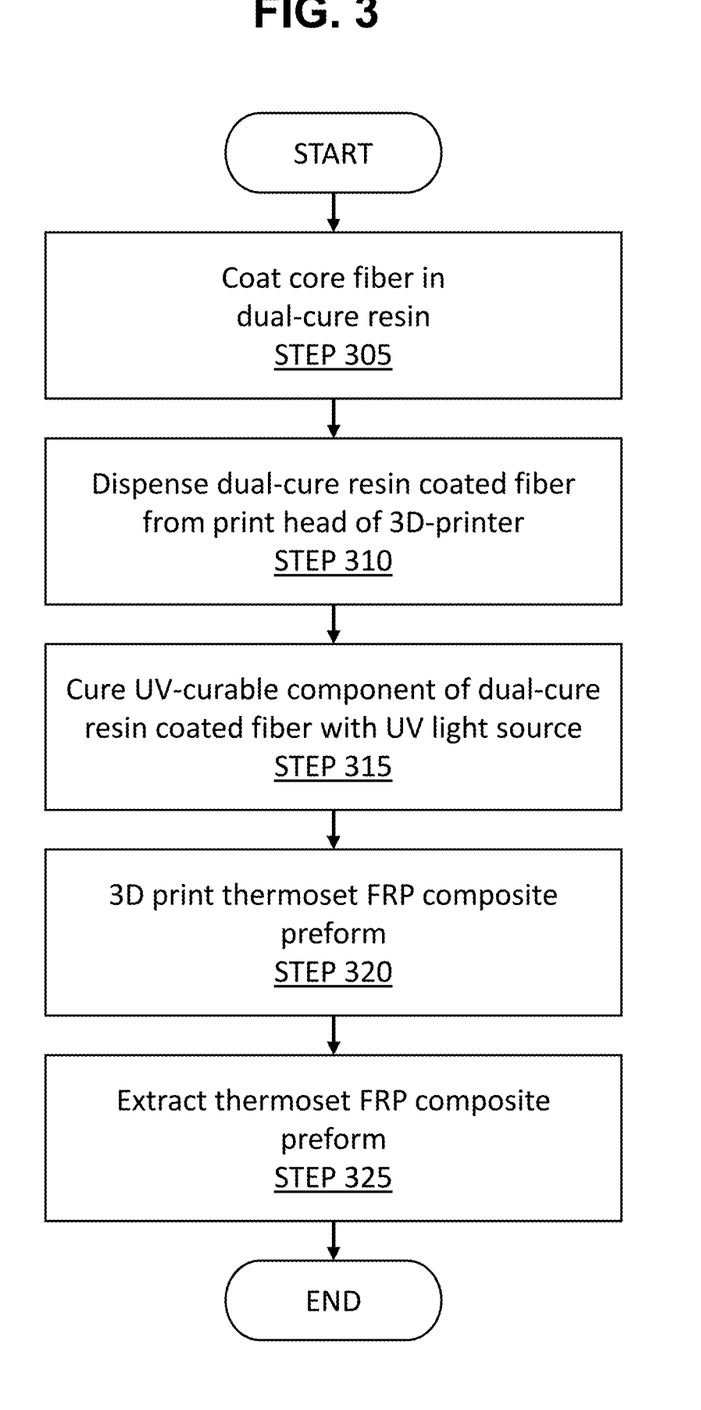
FIG. 3 shows a flowchart for forming a dual-cure resin coated fiber and generating a thermoset FRP composite preform in accordance with one or more embodiments of the invention.
Figure 4:
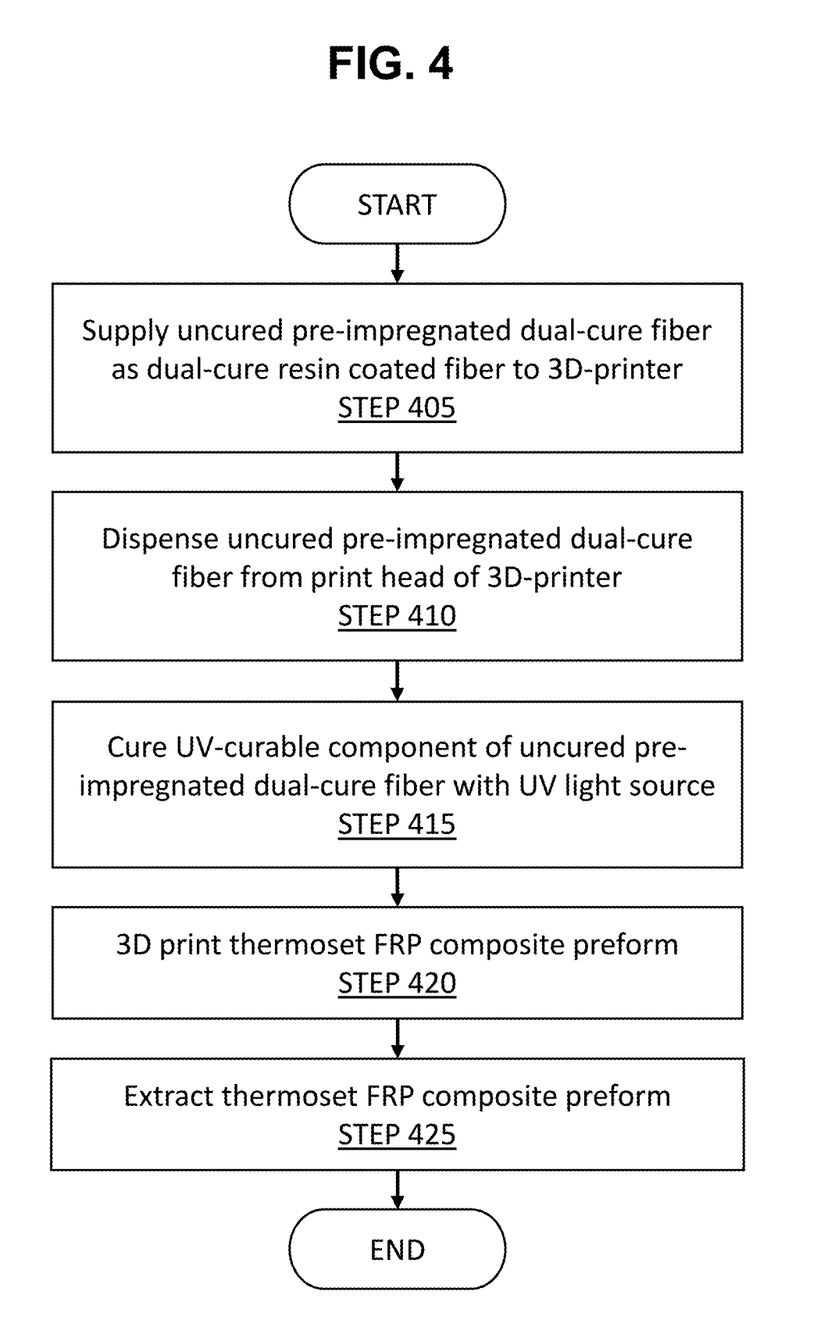
FIG. 4 shows a flowchart for supplying an uncured pre-impregnated dual-cure fiber to generate a thermoset FRP composite preform in accordance with one or more embodiments of the invention.

FIGS. 3 and 4 show flowcharts in accordance with one or more embodiments of the invention. The flowcharts each depict a method for generating a thermoset FRP composite preform. Specifically, FIG. 3 shows a method for forming a dual-cure resin coated fiber (115) and generating a thermoset FRP composite preform (125) and FIG. 4 shows a process for supplying an uncured pre-impregnated dual-cure fiber (205) to generate a thermoset FRP composite preform (125). One or more of the steps in FIGS. 3 and 4 may be performed by the components of systems (100) and (200), discussed above in reference to FIGS. 1 and 2. In one or more embodiments of the invention, one or more of the steps shown in FIGS. 3 and 4 may be omitted, repeated, and/or performed in a different order than the order shown in FIGS. 3 and 4. Accordingly, the scope of the invention should not be considered limited to the specific arrangement of steps shown in FIGS. 3 and 4.

Referring to FIG. 3, as discussed above in reference to FIG. 1, in STEP 305, a core fiber (130) is coated with a dual-cure resin (e.g., by a coating system (140)) to form a dual-cure resin coated fiber (115). The core fiber (130) may be obtained from any source (e.g., a system that manufactures a core fiber or a preprocessed supply of core fiber).

In STEP 310, as discussed above in reference to FIG. 1, the dual-cure resin coated fiber (115) is dispensed from a print head (110) of a 3D-printer (105).

In STEP 315, as discussed above in reference to FIG. 1, a UV-curable component of the dual-cure resin coated fiber (115) is cured with a UV light source (120).

In STEP 320, as discussed above in reference to FIG. 1, a thermoset FRP composite preform (125) is three-dimensionally printed by the 3D-printer (105).

In STEP 325, as discussed above in reference to FIG. 1, the thermoset FRP composite preform (125) is extracted from the 3D-printer (105). The partially-cured dual-cure resin coated fiber (135) is strong enough such that the thermoset FRP composite preform (125) does not substantially deform, warp, or collapse in a permanent manner when handled or manipulated.

Referring to FIG. 4, as discussed above in reference to FIG. 2, in STEP 405, an uncured pre-impregnated dual-cure fiber (205) is supplied as the dual-cure resin coated fiber (115) to the 3D-printer (105). The uncured pre-impregnated dual-cure fiber (205) may be obtained from any source (e.g., a system that manufactures an uncured pre-impregnated dual-cure fiber (205) or a preprocessed supply of uncured pre-impregnated dual-cure fiber (205) that has been stored at low temperatures).

In STEP 410, as discussed above in reference to FIG. 2, the uncured pre-impregnated dual-cure fiber (205) is dispensed from a print head (110) of a 3D-printer (105).

In STEP 415, as discussed above in reference to FIG. 2, a UV-curable component of the uncured pre-impregnated dual-cure fiber (205) is cured with a UV light source (120).

In STEP 420, as discussed above in reference to FIG. 2, a thermoset FRP composite preform (125) is three-dimensionally printed by the 3D-printer (105).

In STEP 425, as discussed above in reference to FIG. 2, the thermoset FRP composite preform (125) is extracted from the 3D-printer (105). The partially-cured dual-cure resin coated fiber (135) is strong enough such that the thermoset FRP composite preform (125) does not substantially deform, warp, or collapse in a permanent manner when handled or manipulated.

In one or more embodiments, the hourly production rate of thermoset FRP composite preforms (125) may be 1.3 kg/hr to 30 kg/hr (cycle time in the range of minutes for a variety of parts), but is not particularly limited to this range. Due to the similarity of the 3D-printing cycle time with the cycle time for molding with HP-RTM, the systems (100) or (200) may be operated in parallel or in series with a molding system.

Figure 5:
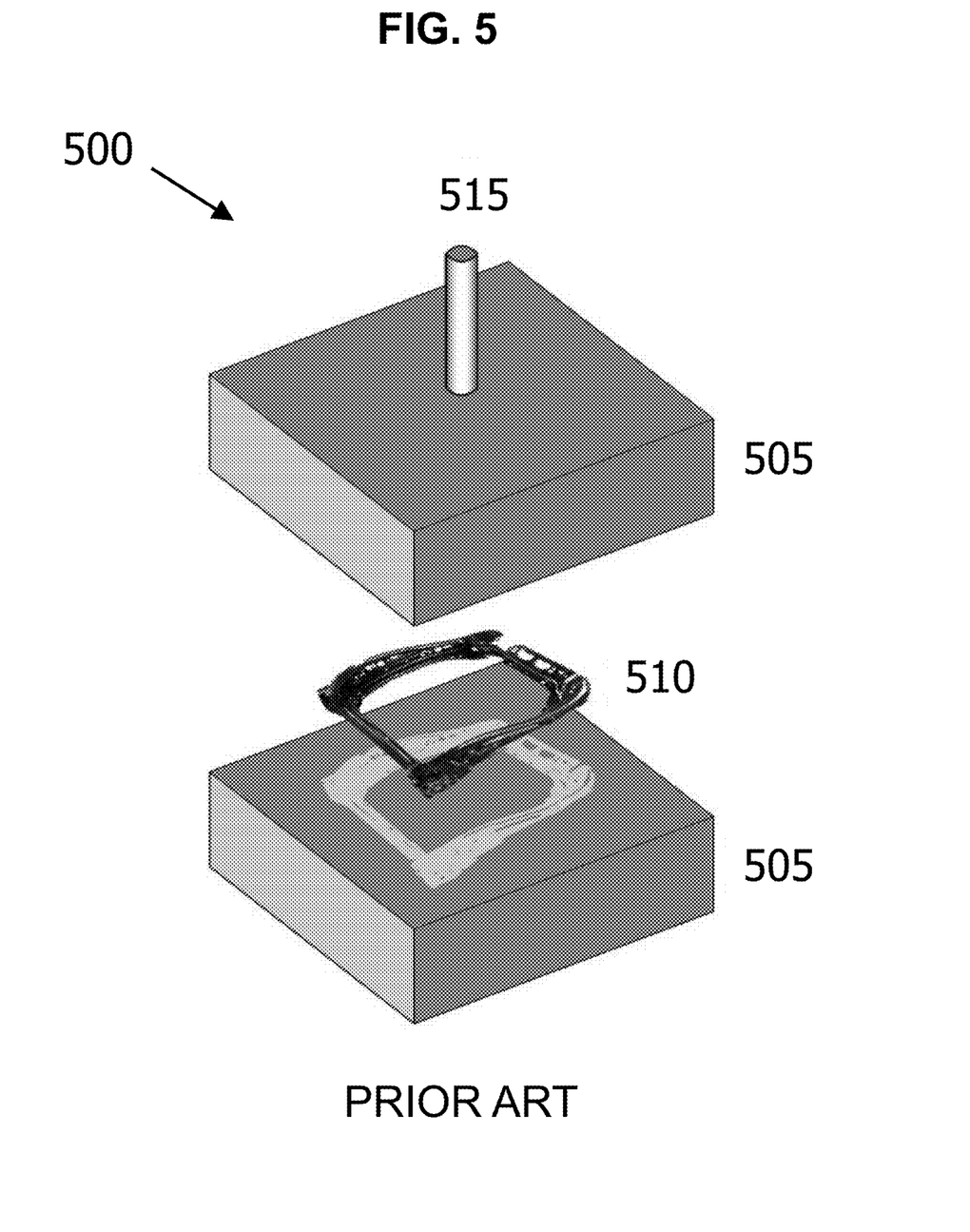
FIG. 5 shows a molding system as known in the art.

FIG. 5 shows a molding system as known in the art. The molding system (500) comprises a mold (505). The cavity of the mold (505) accommodates a preform and defines the shape of the final thermoset FRP composite object (510). A thermally-curable resin is injected into the mold (505) through the resin injection port (515). Heat is applied to the mold (e.g., by conduction or by microwave) to fully cure the dual-cure resin coated fiber (115) and the injected thermally-curable resin. Thus, the thermoset FRP composite preform (125) and injected thermally-curable resin are bonded to create the final thermoset FRP composite object (510).

Figure 6:
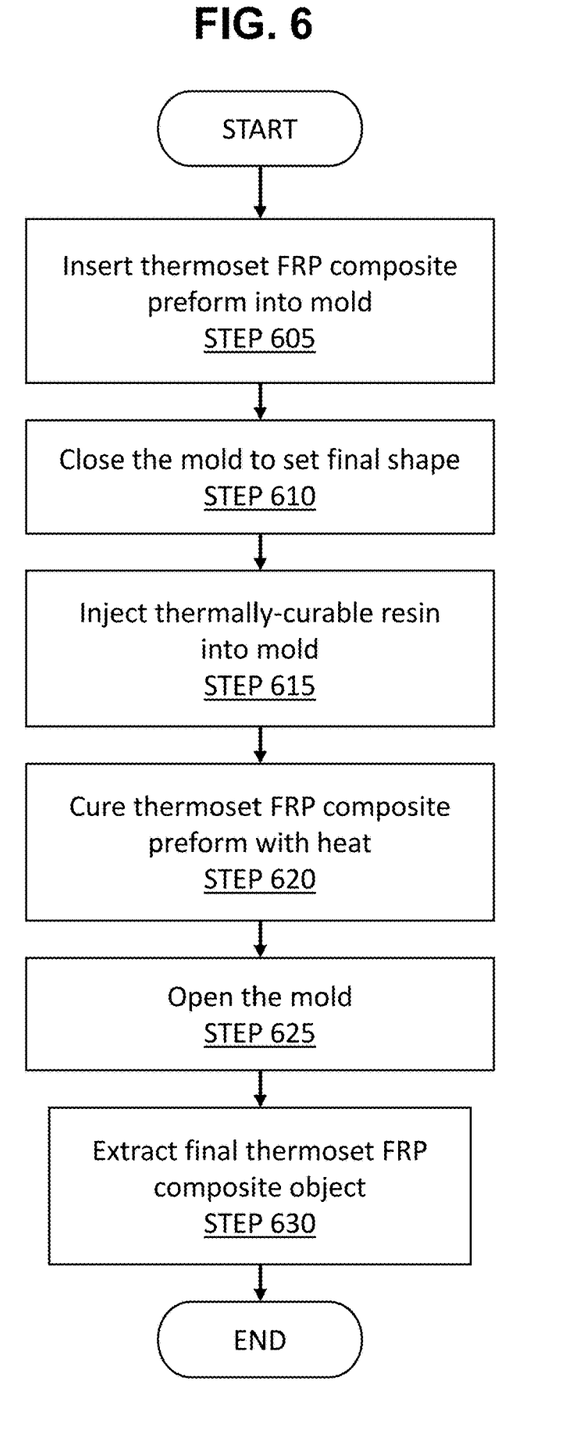
FIG. 6 shows a flowchart for generating a final thermoset FRP composite object in accordance with one or more embodiments of the invention.

FIG. 6 shows a flowchart in accordance with one or more embodiments of the invention. The flowchart depicts a method for generating a final thermoset FRP composite object (510).

Referring to FIG. 6, as discussed above in reference to FIG. 5, in STEP 605, a thermoset FRP composite preform (125) is inserted into the cavity of the mold (505). The partially-cured dual-cure resin coated fiber (135) may be flexible enough to conform to the cavity of the mold (505).

In STEP 610, as discussed above in reference to FIG. 5, the mold (505) is closed around the thermoset FRP composite preform (125) to define the shape of the final thermoset FRP composite object (510).

In STEP 615, as discussed above in reference to FIG. 5, a thermally-curable resin is injected into the mold (505) through the resin injection port (515) and pressurized to fill the cavity of the mold (505), and to infiltrate and permeate the thermoset FRP composite preform (125). The partially-cured dual-cure resin coated fiber (135) may be strong enough such that the partially-cured dual-cure resin coated fiber (135) is not washed out during the pressurized injection. Furthermore, the partially-cured dual-cure resin coated fiber (135) may be dispensed in a pattern that improves resin permeability and permits higher resin injection pressures. Therefore, voids and undesirable nucleation sites may be minimized to improve the physical properties and surface quality of the final thermoset FRP composite object (510).

In STEP 620, as discussed above in reference to FIG. 5, heat is applied to fully cure the injected thermally-curable resin and the thermally-curable component of the partially-cured dual-cure resin coated fiber (135) in the thermoset FRP composite preform (510).

In STEP 625, as discussed above in reference to FIG. 5, the mold (505) is opened to reveal and release the final thermoset FRP composite object (510).

In STEP 630, as discussed above in reference to FIG. 5, the final thermoset FRP composite object (510) is extracted from the mold (505), which is subsequently ready to repeat the molding cycle.

In one or more embodiments, the cycle time of the molding system (500) may be reduced because the thermoset FRP composite preform (125) can be quickly inserted into the cavity of the mold (505). Handling may be automated and transfer time reduced because the thermoset FRP composite preform (125) supports its own shape and weight and can be immediately transferred from the 3D-printer (105) to the mold (505). Because the thermoset FRP composite preform (125) can closely or exactly resemble the shape of cavity of the mold (505) and the final thermoset FRP composite object (510), minimal to no time or process variation are required to conform the thermoset FRP composite preform (125) to the cavity of the mold (505).

In a comparative example, such as using a comparative preform fabricated by ATL or TFP, more time is required to position the comparative preform in the cavity of the mold. The comparative preform comprises fibers disposed on a flat flexible substrate (e.g., held on the flat flexible substrate by supporting tape or stitching yarn). When the comparative preform is placed in a three-dimensional mold, the flat flexible substrate will drape over the shape of the mold. During each molding cycle, an operator needs to inspect the comparative preform and may be required to reposition whole sections, or even individual fibers, to fix crimped or out-of-place portions of the comparative preform, potentially introducing variations in fiber density, fiber location, and fiber orientation in the process. Therefore, using a comparative preform increases the overall cycle time of the molding system and produces a product with lower uniformity.

Figure 7:
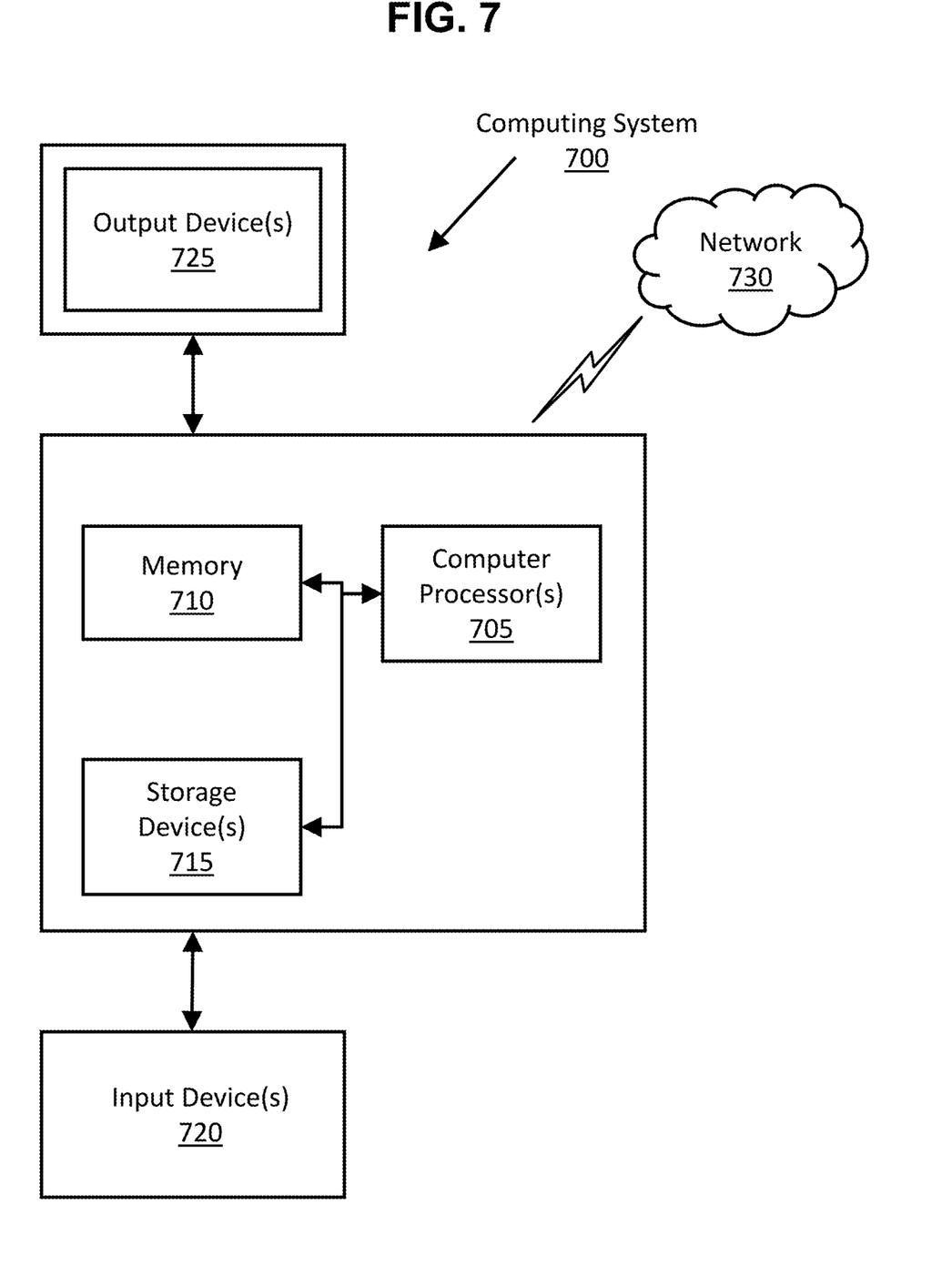
FIG. 7 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (705), associated memory (710) (e.g., random access memory (RAM), cache memory, flash memory, etc.), one or more storage device(s) (715) (e.g., a hard disk, an optical drive such as a compact disk (CD) drive or digital versatile disk (DVD) drive, a flash memory stick, etc.), and numerous other elements and functionalities. The computer processor(s) (705) may be an integrated circuit for processing instructions. For example, the computer processor(s) may be one or more cores, or micro-cores of a processor. The computing system (700) may also include one or more input device(s) (720), such as a touchscreen, keyboard, mouse, microphone, touchpad, electronic pen, or any other type of input device. Further, the computing system (700) may include one or more output device(s) (725), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (730) (e.g., a local area network (LAN), a wide area network (WAN) such as the Internet, mobile network, or any other type of network) via a network interface connection (not shown). The input and output device(s) may be locally or remotely (e.g., via the network (730)) connected to the computer processor(s) (705), memory (710), and storage device(s) (715). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and be connected to the other elements over a network (730). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a thermoset Fiber-Reinforced Polymer (FRP) composite object, the method comprising:
    dispensing, from a print head of a 3D-printer, a dual-cure resin coated fiber comprising a dual-cure resin, wherein the dual-cure resin includes:
        an ultra-violet (UV)-curable component that forms a photo-cured network when cured;
        a thermally-curable component that forms a heat-cured network when cured; and
        a bonding agent that bonds the photo-cured network and the heat-cured network when the dual-cure resin coated fiber is fully cured;
    curing, during the dispensing of the dual-cure resin coated fiber, the UV-curable component with a UV light source such that the dual-cure resin coated fiber is partially cured and contacting lengths of the partially-cured dual-cure resin coated fiber bond together; and
    positioning the print head, during the dispensing and curing of the dual-cure resin coated fiber, to three-dimensionally print a permeable structure that constitutes a thermoset FRP composite preform;
    inserting the thermoset FRP composite preform into a cavity of a mold;
    injecting and pressurizing a thermally-curable resin in the mold to infiltrate the permeable structure of the thermoset FRP composite preform; and
    heating the mold to cure the thermally-curable component and the thermally-curable resin such that the dual-cure resin coated fiber is fully cured at the same time as the thermally-curable resin.

2. The method of claim 1, further comprising:
    forming, prior to the dispensing, the dual-cure resin coated fiber by coating a core fiber with the dual-cure resin.

3. The method of claim 2, wherein
    coating of the core fiber is performed by at least one of a group comprising dip-coating, spraying, brushing, or impregnating the dual-cure resin.

4. The method of claim 1, wherein the dual-cure resin coated fiber being dispensed from the print head is an uncured pre-impregnated dual-cure fiber.

5. The method of claim 1, wherein
    the UV light source that cures the UV-curable component comprises a light emitting diode (LED) lamp,
    the LED lamp has a power greater than or equal to 3 W and less than or equal to 30 W, and
    the LED lamp illuminates a surface of the dual-cure resin coated fiber with an intensity of 3 J/mm$^2$ or more.

6. The method of claim 1, further comprising cutting the dispensed dual-cure resin coated fiber with a mechanical chopper of the print head.

7. The method of claim 1, further comprising cutting the dispensed dual-cure resin coated fiber with a laser of an optical chopper of the print head.

8. The method of claim 1, wherein the bonding agent is one selected from a group comprising: bisphenol A diglycidyl ether; an amine hardener; an anhydride hardener; an oligomeric acrylate, a partially acrylated epoxy oligomer; and a fully acrylated epoxy oligomer.

9. The method of claim 1, wherein a shape of the thermoset FRP composite preform has a self-supporting shape that fits the cavity without a supplemental support structure.

10. The method of claim 1, wherein the injecting and the pressurizing of the thermally-curable resin are performed below a predetermined pressure that washes out the partially cured dual-cure resin coated fiber.

\* \* \* \* \*